US011192632B2

(12) United States Patent
Dovey

(10) Patent No.: US 11,192,632 B2
(45) Date of Patent: Dec. 7, 2021

(54) SLAT END SEAL AND METHOD FOR MANUFACTURING THE SAME

(71) Applicant: The Boeing Company, Chicago, IL (US)

(72) Inventor: John Dovey, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 566 days.

(21) Appl. No.: 16/160,002

(22) Filed: Oct. 15, 2018

(65) Prior Publication Data

US 2020/0115034 A1  Apr. 16, 2020

(51) Int. Cl.
*B64C 9/24* (2006.01)
*B64C 7/00* (2006.01)
*B33Y 50/00* (2015.01)
*B33Y 80/00* (2015.01)

(52) U.S. Cl.
CPC ............ *B64C 9/24* (2013.01); *B64C 7/00* (2013.01); *B33Y 50/00* (2014.12); *B33Y 80/00* (2014.12)

(58) Field of Classification Search
CPC .... B64C 9/22; B64C 9/24; B64C 9/26; B64C 7/00
See application file for complete search history.

(56) References Cited

U.S. PATENT DOCUMENTS

| 3,486,720 A | 12/1969 | Seglem |
| 5,518,210 A | 5/1996 | Friberg |
| 5,544,847 A | 8/1996 | Bliesner |
| 6,394,397 B1 * | 5/2002 | Ngo ............... B64C 27/463 244/199.3 |
| 8,657,236 B2 | 2/2014 | Triches |
| 2013/0156591 A1 * | 6/2013 | Alexander ........... F01D 5/323 416/221 |

(Continued)

FOREIGN PATENT DOCUMENTS

| GB | 2504744 A | 2/2014 |
| WO | WO 2008/082437 | 7/2008 |

OTHER PUBLICATIONS

Moon et al., "Application of 3D Printing Technology for Designing Light-weight Unmanned Aerial Vehicle Wing Structures", International Journal of Precision Engineering and Manufacturing-Green Technology, 1(3):223-228 (2014).

(Continued)

*Primary Examiner* — Nicholas McFall
*Assistant Examiner* — Terri L Filosi
(74) *Attorney, Agent, or Firm* — McDonnell Boehnen Hulbert & Berghoff LLP

(57) ABSTRACT

The present disclosure provides a slat end seal for use with a slat of an aircraft. The slat end seal includes a shell having a first surface, a second surface opposite the first surface, and a sidewall extending from the first surface. The shell includes a plurality of through holes in the first surface of the shell. The slat end seal also includes a lattice structure coupled to the first surface of the shell and configured to compress in response to a force applied to the second surface of the shell. The lattice structure includes a plurality of supports defining a plurality of interstitial voids between the plurality of supports. The lattice structure also includes at least one through hole aligned with at least one through hole of the plurality of through holes in the first surface of the shell.

20 Claims, 11 Drawing Sheets

(56) References Cited

U.S. PATENT DOCUMENTS

| | | |
|---|---|---|
| 2014/0163445 A1 | 6/2014 | Pallari |
| 2015/0145274 A1* | 5/2015 | Hirose .................... B60R 13/08 296/39.3 |
| 2017/0011155 A1 | 1/2017 | Ruto |
| 2021/0172045 A1* | 6/2021 | Inoue ....................... C21D 9/32 |

OTHER PUBLICATIONS

Extended European Search Report prepared by the European Patent Office in application No. EP 19 19 0054.7 dated Mar. 10, 2020.

* cited by examiner

SLAT END SEAL AND METHOD FOR MANUFACTURING THE SAME

FIELD

The present disclosure relates generally to a slat end seal, and more particularly, to a slat end seal for use with a slat of a winged aircraft.

BACKGROUND

Traditionally, wing slats have end seals that help maintain a continuous slot across the wing span of a winged aircraft and achieve optimal low-speed aerodynamic performance. The slat end seal also enables the wing to flex when in use. The traditional design employs a rigid injection molded end seal (or "pork chop" seal) that translates in an inboard-outboard direction via springs and pins to fill the gap between two adjacent slats. The metal hardware required typically includes three sets of coil springs, each with a long center pin, spacer, and end cap plates. The slat end seal maintains a firm spring force to stay fully butted to the adjacent slat during all phases of flight and be able to absorb some inboard-outboard translation as the wing flexes. Such a design requires multiple metallic parts that incurs cost, part count, and adds weight.

SUMMARY

In one aspect, a slat end seal is described. The slat end seal includes (a) a shell having a first surface, a second surface opposite the first surface, and a sidewall extending from the first surface, wherein the shell includes a plurality of through holes in the first surface of the shell, and (b) a lattice structure coupled to the first surface of the shell and configured to compress in response to a force applied to the second surface of the shell, wherein the lattice structure includes a plurality of supports defining a plurality of interstitial voids between the plurality of supports, and wherein the lattice structure includes at least one through hole aligned with at least one through hole of the plurality of through holes in the first surface of the shell.

In another aspect, a method of manufacturing a slat end seal is described. The method includes (a) forming a lattice structure including a plurality of supports defining a plurality of interstitial voids between the plurality of supports, and wherein the lattice structure includes at least one through hole, and (b) coupling the lattice structure to a first surface of a shell, wherein the shell includes a sidewall extending from the first surface, wherein the shell further includes a plurality of through holes in the first surface of the shell, and wherein one of the plurality of through holes in the first surface of the shell is aligned with the at least one through hole of the lattice structure when the lattice structure is coupled to the first surface of the shell.

The features, functions, and advantages that have been discussed can be achieved independently in various examples or may be combined in yet other examples further details of which can be seen with reference to the following description and figures.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative examples of the present disclosure when read in conjunction with the accompanying figures.

DETAILED DESCRIPTION

The examples described herein provide an improved slat end seal and corresponding method of manufacturing the slat end seal. More specifically the examples described herein include a one-piece slat end seal that can be made via additive manufacturing. The slat end seal described herein includes an internal lattice structure that replaces the traditional design of a rigid injection molded seal plus a number of metal springs and other components. The internal lattice structure of the improved slat end seal is built to withstand inboard-outboard forces traditionally absorbed by metal compression springs. The improved slat end seal described herein can help reduce the cost of the slat end seal, reduce the number of parts required to construct the slat end seal, and reduce the overall weight of the slat end seal. In addition, the improved slat end seal may reduce the space envelope needed for the seal, thereby helping integration with the slat structure.

Various other features of the example slat end seal discussed above, as well as methods for manufacturing and using the example slat end seal, are also described hereinafter with reference to the accompanying figures. While the focus of the disclosure is on slat end seals, the deigns and methods described herein may be used on the ends of other aircraft wing devices, such as elevators, ailerons, flaps, or other types of movable wing or empennage surfaces. Illustrative, non-exhaustive examples, which may or may not be claimed, of the subject matter according the present disclosure are provided below.

Figure 1:
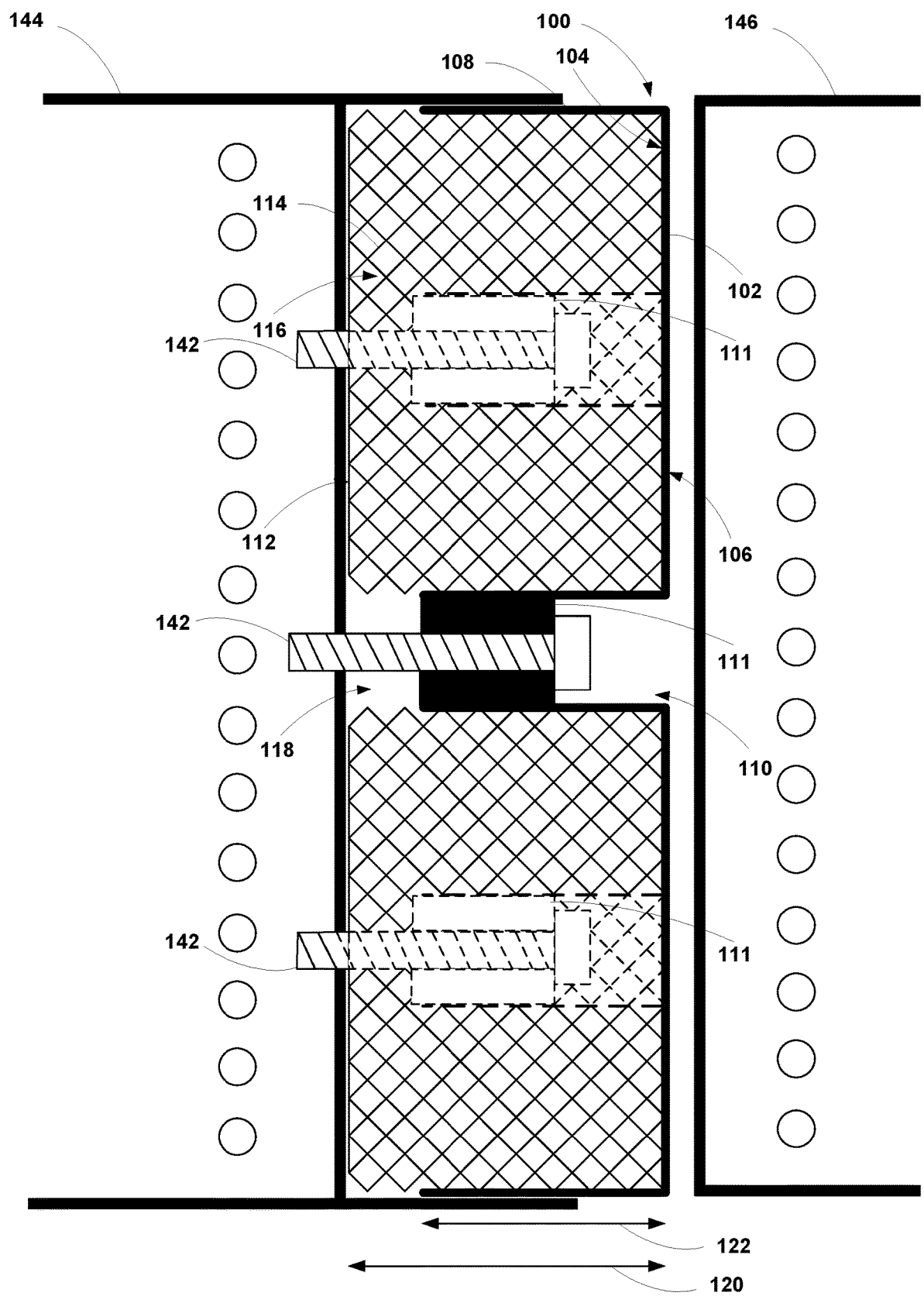
FIG. 1 is side cross-section view of an example slat end seal.

With reference to the Figures, FIG. 1 illustrates an example slat end seal 100 for use with a slat of a winged aircraft. As shown in FIG. 1, the slat end seal 100 includes a shell 102 having a first surface 104, a second surface 106 opposite the first surface 104, and a sidewall 108 extending from the first surface 104. The shell 102 includes a plurality of through holes 110 in the first surface 104 of the shell 102. The slat end seal 100 also includes a lattice structure 112 coupled to the first surface 104 of the shell 102 and configured to compress in response to a force applied to the second surface 106 of the shell 102. The lattice structure 112 includes a plurality of supports 114 defining a plurality of interstitial voids 116 between the plurality of supports 114. The lattice structure 112 also includes at least one through hole 118 aligned with at least one through hole of the plurality of through holes 110 in the first surface 104 of the shell 102. The slat end seal 100 may also include a boss 111 aligned with both the at least one through hole of the plurality of through holes 110 in the first surface 104 of the shell 102 and the at least one through hole 118 of the lattice structure. The boss 111 is configured to receive a bolt 142 to secure the slat end seal 100 to its respective slat 144 before an adjacent slat 146 is installed, as discussed in additional detail below. The lattice structure 112 may comprise polyether ether ketone (PEEK), polyethylene (PE), nylon, or polypropylene (PP), as non-limiting examples. A diameter of the plurality of supports 114 of the lattice structure 112 may range from about 1 mm to about 5 mm.

The plurality of supports 114 that make up the lattice structure 112 may take a variety of forms, including straight elements, curved elements, coils, circles, or combinations thereof as non-limiting examples. In one example, the plurality of supports 114 of the lattice structure 112 comprise a repeating pattern throughout the entire lattice structure 112. In another example, the plurality of supports 114 of the lattice structure 112 are asymmetrical throughout the lattice structure 112. In one particular example, a first portion of the plurality of supports 114 of the lattice structure 112 have a first density, and a second portion of the plurality of supports 114 of the lattice structure 112 have a second density that is greater than the first density. As such, the lattice structure 112 may be stiffer in the second portion than in the first portion. In another example, the plurality of supports 114 in a first portion of the lattice structure 112 have a first diameter, and the plurality of supports 114 in as second portion of the lattice structure 112 have a second diameter that is greater than the first diameter. As such, the lattice structure 112 may be stiffer in the second portion than in the first portion. Other examples are possible as well. According to the examples described above, the plurality of supports 114 of the lattice structure 112 may be tailored for a particular use case depending on the forces that will be applied to the slat end seal 100 when in use to thereby maximize performance of the slat end seal 100.

In one example, as shown in FIG. 1, a height 120 of the lattice structure 112 is greater than a height 122 of the sidewall 108 of the shell 102 when the lattice structure 112 is not compressed. Such a configuration requires the lattice structure 112 to be pre-loaded when installed between adjacent slats, which advantageously positions the lattice structure 112 in a neutral position once installed. The pre-loaded neutral position places the lattice structure 112 within a desired optimal range on the force/displacement curve.

Figure 2A:
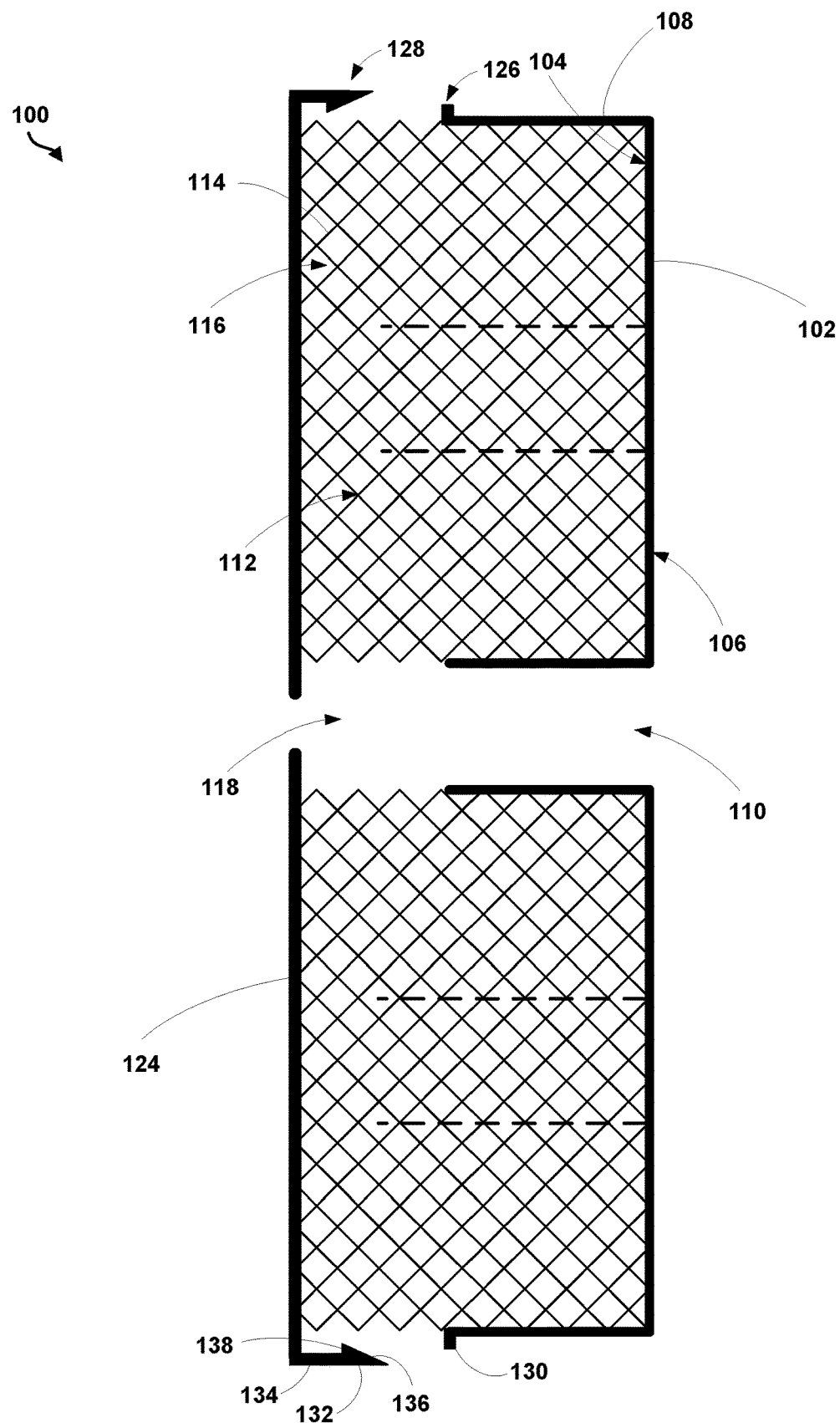
FIG. 2A is a side cross-section view of the example slat end seal including a base plate in an uncompressed state.
Figure 2B:
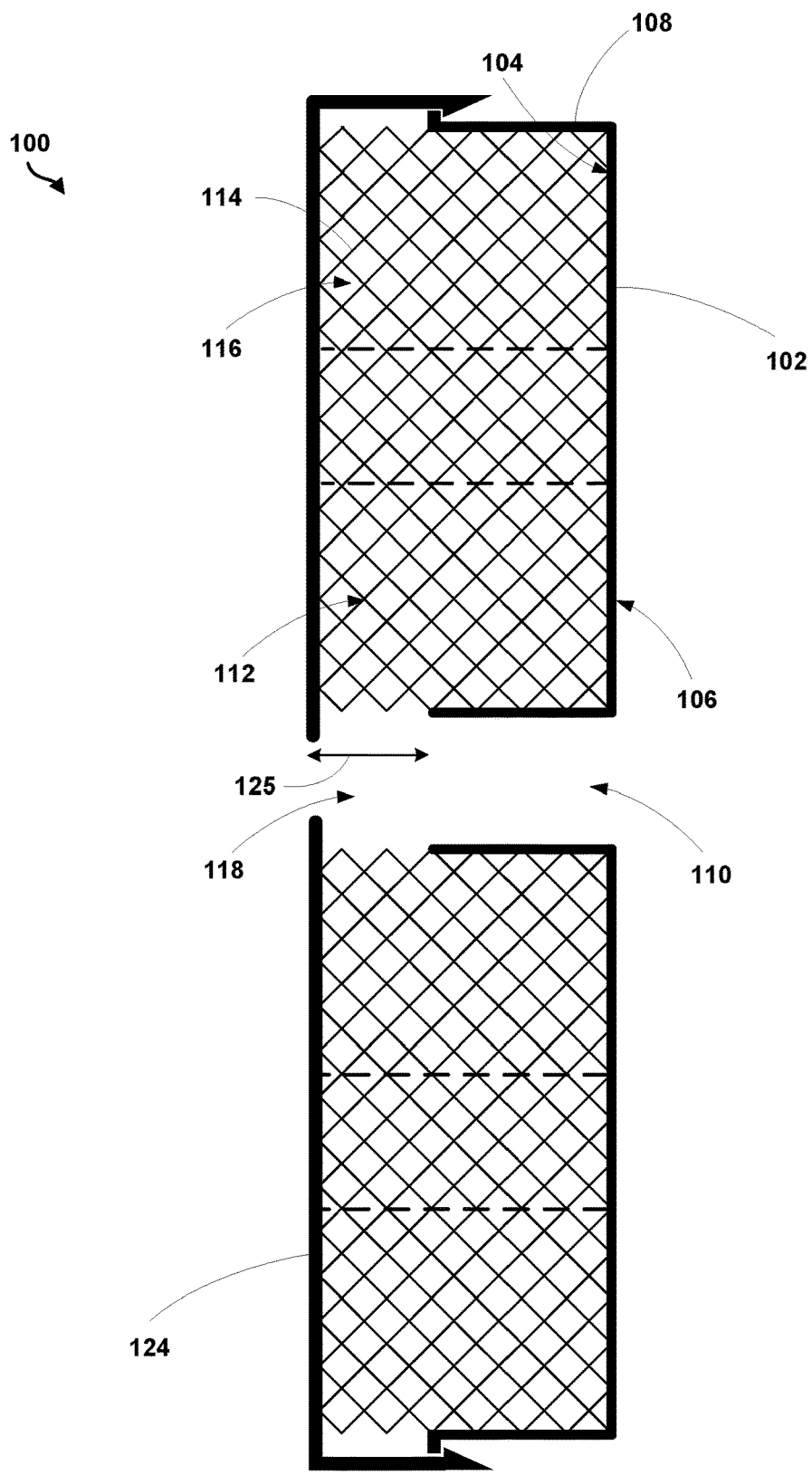
FIG. 2B is a side cross-section view of the slat end seal of FIG. 2A in a partially compressed state.

As shown in FIG. 2A, the slat end seal 100 may also include a base plate 124 coupled to the lattice structure 112 opposite the first surface 104 of the shell 102. FIG. 2A illustrates the base plate 124 prior to assembly. As shown in FIG. 2B, the base plate 124 may be further coupled to the sidewall 108 of the shell 102 such that the lattice structure 112 is at least partially compressed when the base plate 124 is coupled to the sidewall 108. As such, the lattice structure 112 is pre-loaded when the base plate 124 is coupled to the sidewall 108 of the shell 102. As shown in FIG. 2B, even when the base plate 124 is coupled to the sidewall 108 of the shell 102, there may be a gap 125 between the base plate 124 and the top of the sidewall 108. This gap 125 enables the lattice structure 112 to further compress due to various forces applied to the base plate 124 and/or the shell 102 when the slat end seal 100 is in use.

In one example, as shown in FIGS. 2A-2B, the sidewall 108 may include a first plurality of locking features 126 configured to interact with a corresponding second plurality of locking features 128 extending from the base plate 124 to thereby partially compress the lattice structure 112 when the base plate 124 is coupled to the sidewall 108. At an uncompressed state, the base plate 124 may be coupled to the lattice structure 112 and positioned a distance away from the sidewall 108. As the base plate 124 moves closer to the sidewall 108, the lattice structure 112 is compressed until the first plurality of locking features 126 interact with the second plurality of locking features 128 to prevent additional movement of the base plate 124 towards the first surface 104 of the shell 102.

In one particular example, as shown in FIGS. 2A-2B, the first plurality of locking features 126 comprise a plurality of protrusions 130 extending from the sidewall 108 of the shell 102, and the second plurality of locking features 128 comprise a plurality of angled tabs 132 extending from the base plate 124. In such an example, the plurality of angled tabs 132 are configured to interact with the plurality of protrusions 130 to couple the base plate 124 to the shell 102 with the lattice structure 112 at least partially compressed. In particular, each of the plurality of angled tabs 132 may include an arm 134, an angled surface 136, and a notch 138. At an uncompressed state, the base plate 124 may be coupled to the lattice structure 112 and positioned a distance away from the sidewall 108, as shown in FIG. 2A. As the base plate 124 moves closer to the sidewall 108, the lattice structure 112 is compressed until the angled surface 136 of each of the plurality of angled tabs 132 contacts the each of the plurality of protrusions 130. As the base plate 124 continues to move closer to the sidewall 108, the angled surface 136 contacting the protrusion 130 causes the arm 134 of the angled tab 132 to flex outward. This outward flexing enables the angled surface 136 of each of the plurality of angled tabs 132 to move past each of the plurality of protrusions 130. Once the angled surface 136 of each of the plurality of angled tabs 132 moves past each of the plurality of protrusions 130, the arm 134 snaps back inward and the notch 138 of each of the plurality of angled tabs 132 contacts a corresponding protrusion of the plurality of protrusions 130 to prevent additional movement of the base plate 124 towards the first surface 104 of the shell.

In another example, the first plurality of locking features 126 comprise a plurality of angled tabs 132 extending from the sidewall 108 of the shell 102, and the second plurality of locking features 128 comprise a plurality of protrusions 130 extending from the base plate 124. In such an example, the structure of the angled tabs 132 and protrusions 130 may be the same as described above, but their locations may be reversed. Other example locking features 126, 128 are possible as well.

Figure 3:
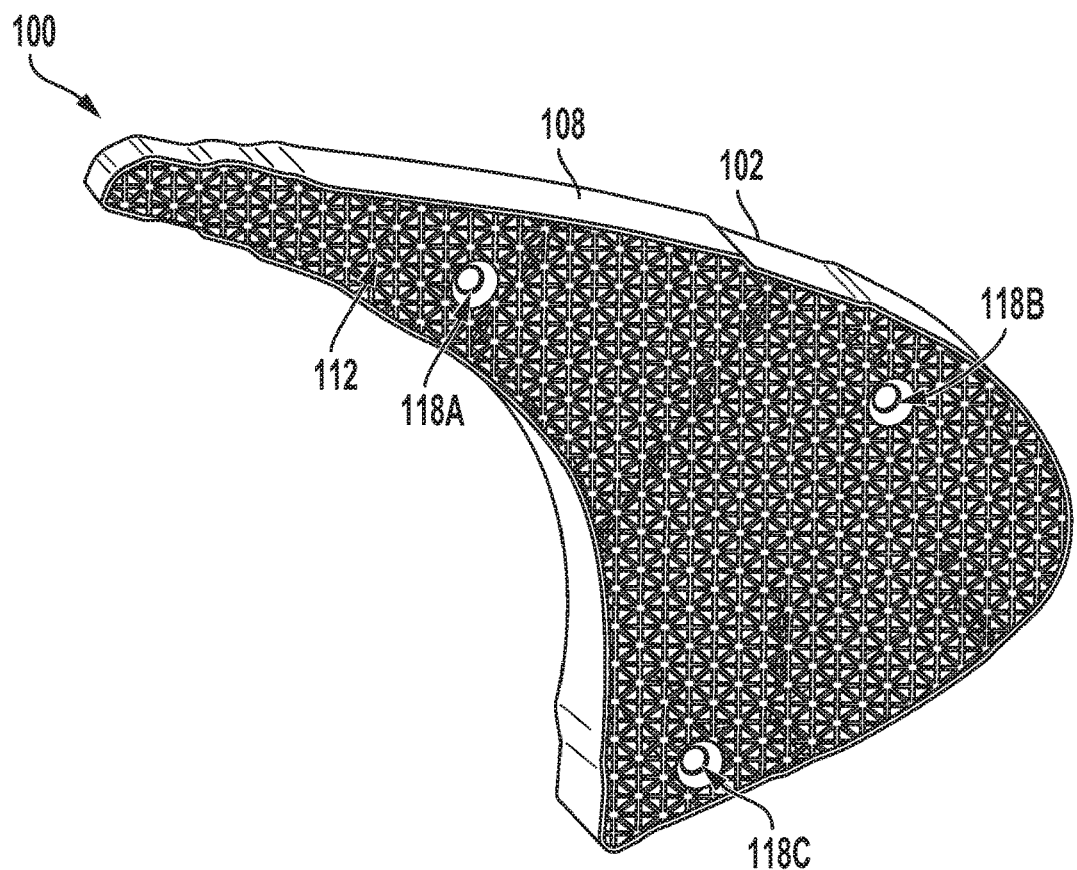
FIG. 3 is an interior perspective view of the slat end seal of FIG. 1.
Figure 4:
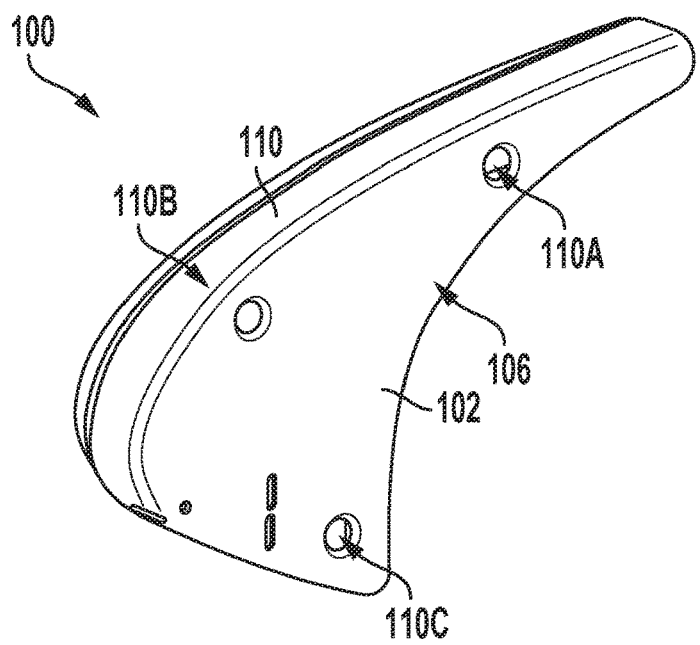
FIG. 4 is an exterior perspective view of the slat end seal of FIG. 1.
Figure 5:
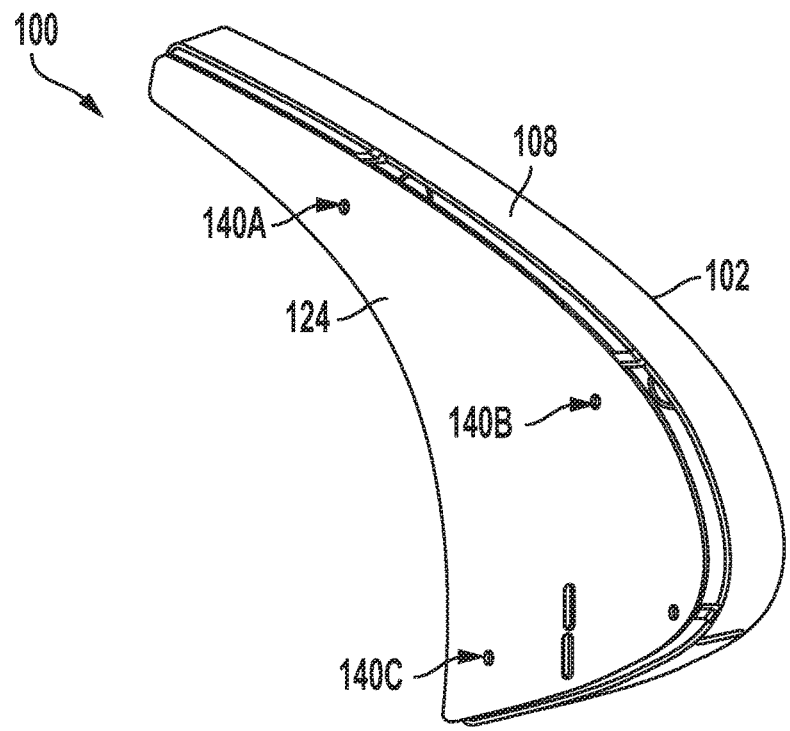
FIG. 5 is a perspective view of the slat end seal of FIG. 2B.
Figure 6:
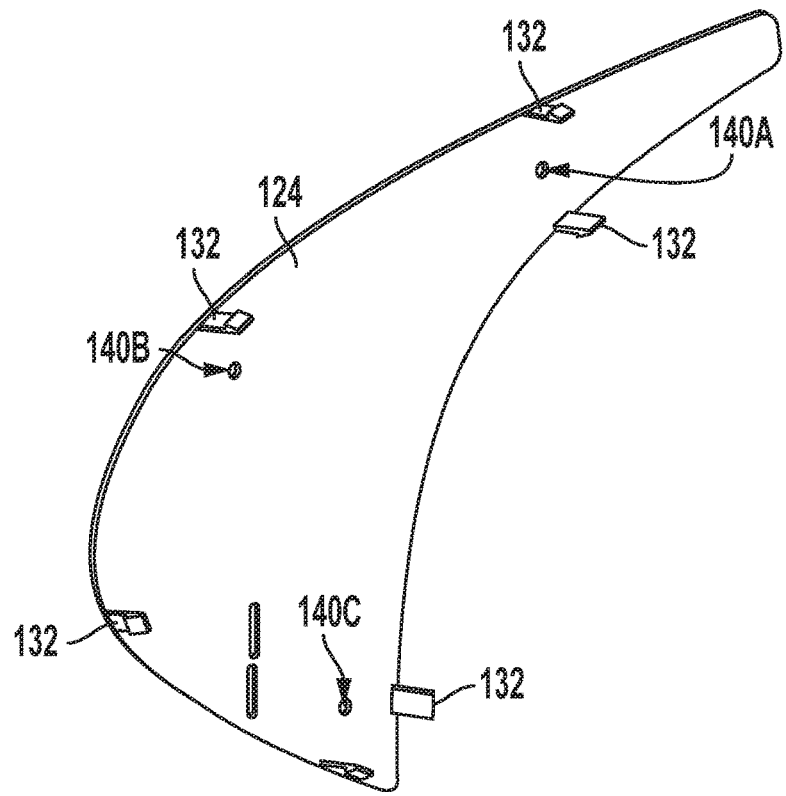
FIG. 6 is a perspective view of the base plate of FIG. 5.

In one particular example, as shown in FIGS. 3-4, the at least one through hole 118 of the lattice structure 112 comprises a first through hole 118A aligned with a first through hole 110A of the plurality of through holes 110 in the first surface 104 of the shell 102, a second through hole 118B aligned with a second through hole 110B of the plurality of through holes 110 in the first surface 104 of the shell 102, and a third through hole 118C aligned with a third through hole 110C of the plurality of through holes 110 in the first surface 104 of the shell 102. In such an example, as shown in FIGS. 5-6, the base plate 124 includes a first through hole 140A aligned with the first through hole 118A of the lattice structure 112 and the first through hole 110A of the shell 102, a second through hole 140B aligned with the second through hole 118B of the lattice structure 112 and the second through hole 110B of the shell 102, and a third through hole 140C aligned with the third through hole 118B of the lattice structure 112 and the third through hole 110C of the shell 102. Such an arrangement fixes the base plate 124 to the slat structure 144 to ensure propose position, alignment, and retention.

Figure 7:
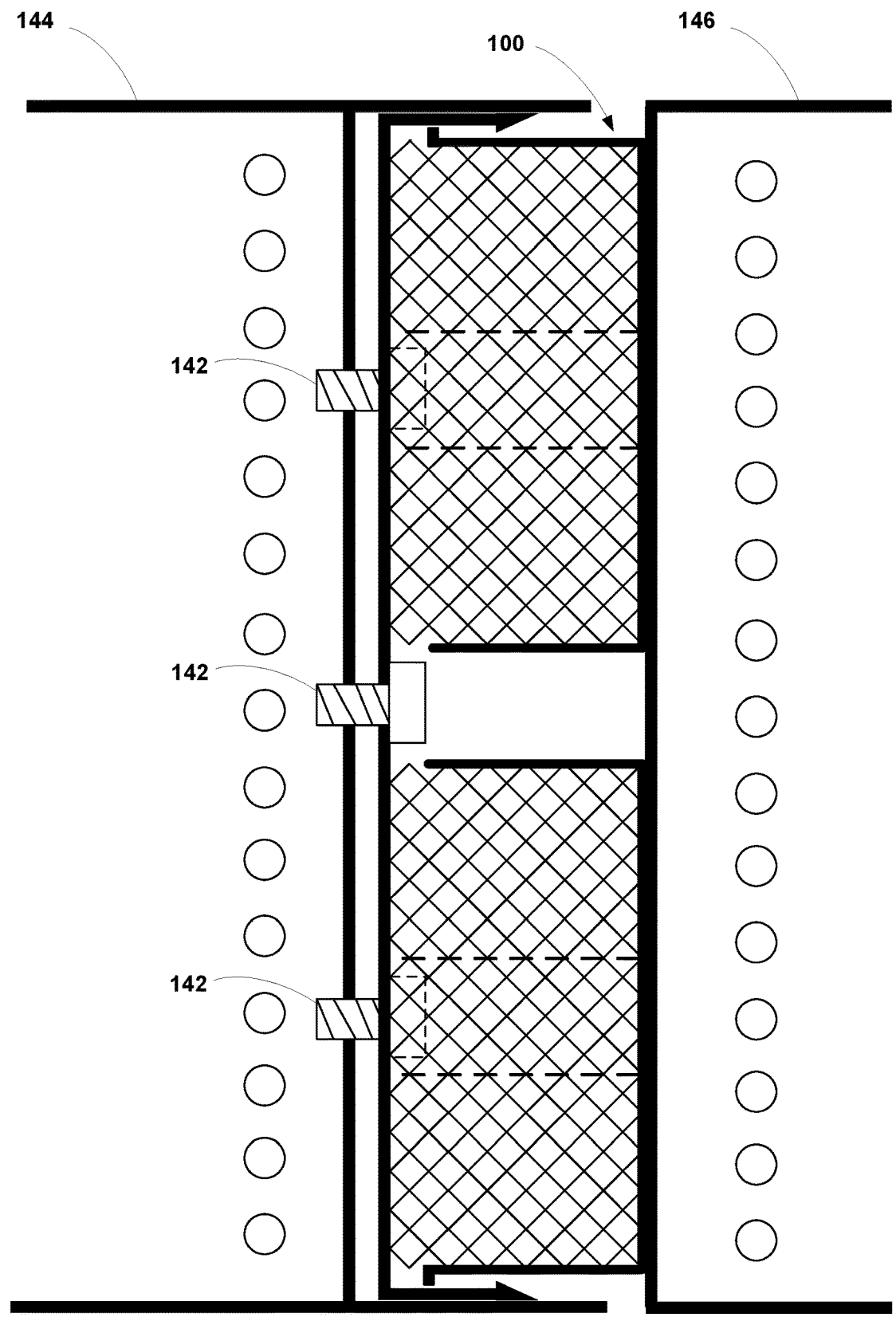
FIG. 7 is a side cross-section view of the slat end seal of FIG. 2A coupled to a slat.

In addition, as shown in FIG. 7, the through holes, described above, further provide access, through which bolts 142 may be passed to secure the slat end seal 100 to a slat 144. As shown in FIG. 7, the bolts 142 may be passed through the through holes 110A, 110B, 110C of the shell 102, through the through holes 118A, 118B, 118C of the lattice structure 112, and through the through holes 140A, 140B, 140C of the base plate 124. The bolts 142 may then be fastened to the slat 144, thereby retaining the end seal. An adjacent slat 146 is positioned to abut the second surface 106 of the shell 102 of the slat end seal 100.

Figure 8:
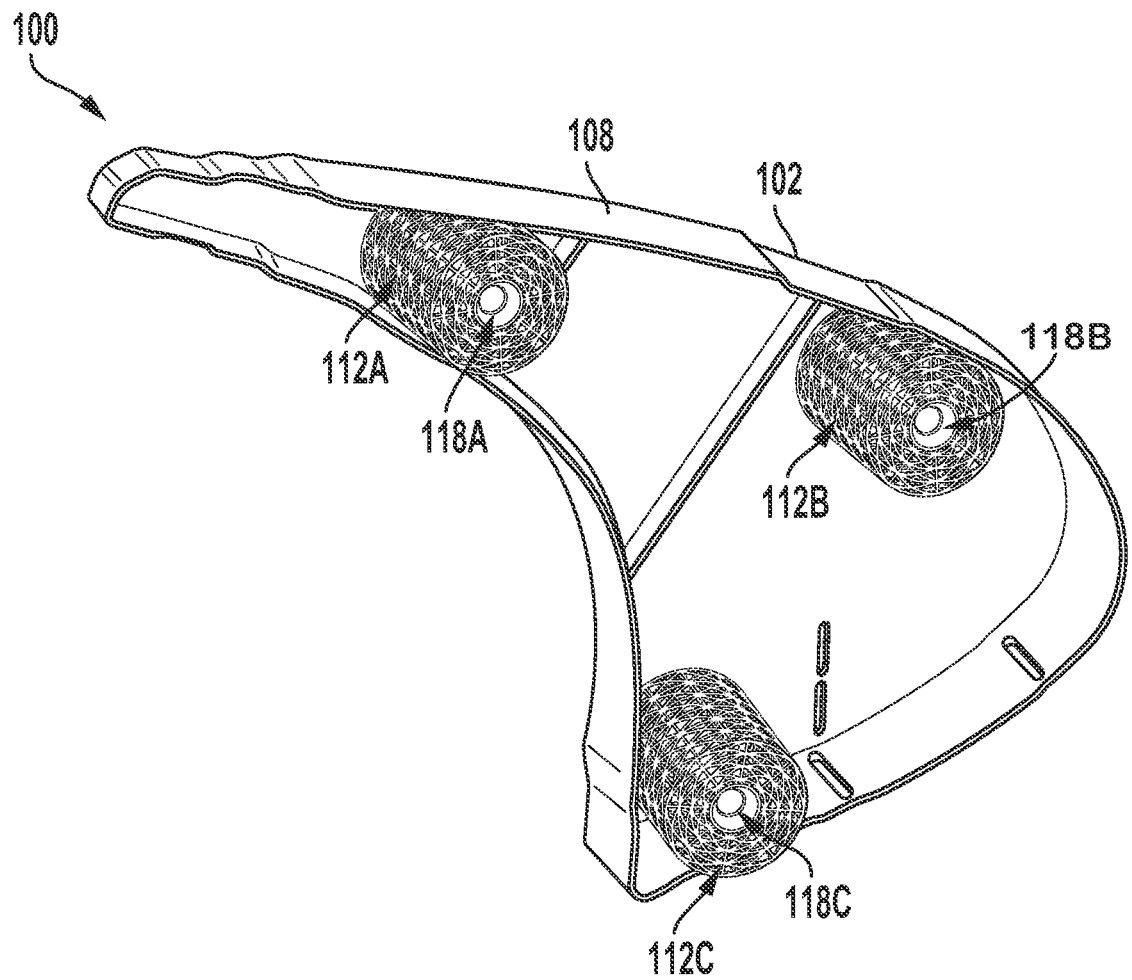
FIG. 8 is a top perspective view of another example slat end seal.

In one example, as illustrated above in FIGS. 1-7, the lattice structure 112 is a continuous structure that spans all or substantially all of the cavity defined by the shell 102 and sidewall 108. In another example, as shown in FIG. 8, the lattice structure 112 may comprise separate and distinct lattice structures. In particular, the lattice structure 112 may comprise a first lattice structure 112A, a second lattice structure 112B, and a third lattice structure 112C. Each of the first lattice structure 112A, the second lattice structure 112B, and the third lattice structure 112C may be similarly configured as the lattice structure 112 described above, including a plurality of supports 114 defining a plurality of interstitial voids 116 between the plurality of supports 114. The first lattice structure 112A is coupled to the first surface 104 of the shell 102 and is configured to compress in response to a force applied to the second surface 106 of the shell 102. The first lattice structure 112A includes a first through hole 118A aligned with a first through hole 110A of the plurality of through holes 110 in the first surface 104 of the shell 102.

The second lattice structure 112B is coupled to the first surface 104 of the shell 102 and configured to compress in response to a force applied to the second surface 106 of the shell 102. The second lattice structure 112B includes a second through hole 118B aligned with a second through hole 110B in the first surface 104 of the shell 102. Similarly, the third lattice structure 112C is coupled to the first surface 104 of the shell 102 and configured to compress in response to a force applied to the second surface 106 of the shell 102. The third lattice structure 112C includes a third through hole 118C aligned with a third through hole 110C in the first surface 104 of the shell 102.

In one example, the slat end seal 100 further includes a single base plate 124 coupled to each of the first lattice structure 112A, the second lattice structure 112B, and the third lattice structure 112C. In such an example, as discussed above, the sidewall 108 may include a first plurality of locking features 126 configured to interact with a corresponding second plurality of locking features 128 extending from the base plate 124 to thereby partially compress the lattice structure 112 when the base plate 124 is coupled to the sidewall 108. As discussed above, the first plurality of locking features 126 comprise a plurality of protrusions 130 extending from the sidewall 108 of the shell 102, and the second plurality of locking features 128 comprise a plurality of angled tabs 132 extending from the base plate 124.

Figure 9:
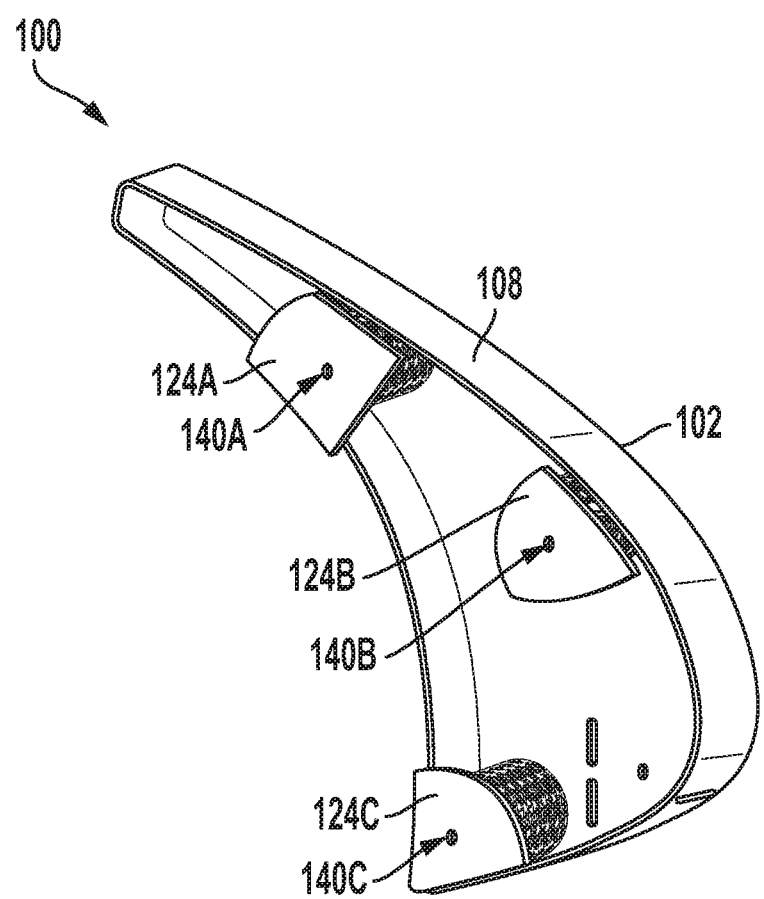
FIG. 9 is a top perspective view of the slat end seal of FIG. 8 including a first base plate, a second base plate, and a third base plate.

In another example, as shown in FIG. 9, the slat end seal 100 includes a first base plate 124A coupled to the first lattice structure 112A opposite the first surface 104 of the shell 102, a second base plate 124B coupled to the second lattice structure 112B opposite the first surface 104 of the shell 102, and a third base plate 124C coupled to the third lattice structure 112C opposite the first surface 104 of the shell 102. In such an example, the first base plate 124A includes a first through hole 140A aligned with the first through hole 118A of the first lattice structure 112A and the first through hole 110A of the shell 102, the second base plate 124B includes a second through hole 140B aligned with the second through hole 118B of the second lattice structure 112B and the second through hole 110B of the shell 102, and the third base plate 124C includes a third through hole 140C aligned with the third through hole 118C of the third lattice structure 112C and the third through hole 110C of the shell 102. As discussed above, the through holes described above provide an access through which bolts 142 may be passed to secure the slat end seal 100 to its respective slat 144.

In one such example, the first base plate 124A may be coupled to the sidewall 108 of the shell 102 such that the first lattice structure 112A is at least partially compressed when the first base plate 124A is coupled to the sidewall 108, the second base plate 124B may be coupled to the sidewall 108 of the shell 102 such that the second lattice structure 112B is at least partially compressed when the second base plate 124B is coupled to the sidewall 108, and the third base plate 124C may be coupled to the sidewall 108 of the shell 102 such that the third lattice structure 112C is at least partially compressed when the third base plate 124C is coupled to the sidewall 108. In such an example, as discussed above, the sidewall 108 may include a first plurality of locking features 126 configured to interact with a corresponding second plurality of locking features 128 extending from the first base plate 124A, the second base plate 124B, and the third base plate 124C, to thereby partially compress each of the first lattice structure 112A, the second lattice structure 112B, and the third lattice structure 112C. As discussed above, the first plurality of locking features 126 may comprise a plurality of protrusions 130 extending from the sidewall 108 of the shell 102, and the second plurality of locking features 128 may comprise a plurality of angled tabs 132 extending from the first base plate 124A, the second base plate 124B, and the third base plate 124C. Although three lattice structures 112A, 112B, 112C are illustrated in FIGS. 8-9, other numbers of lattice structures are possible as well.

In some examples, such as shown in any one of FIGS. 1-9, one or more components of the slat end seal 100 is made via an additive manufacturing process using an additive-manufacturing machine, such as stereolithography, multi-jet modeling, inkjet printing, selective laser sintering/melting, and fused filament fabrication, among other possibilities. Additive manufacturing enables one or more components of the slat end seal 100 and other physical objects to be created as intraconnected single-piece structure through the use of a layer-upon-layer generation process. Additive manufacturing involves depositing a physical object in one or more selected materials based on a design of the object. For example, additive manufacturing can generate one or more components of the slat end seal 100 using a Computer Aided Design (CAD) of the slat end seal 100 as instructions. As a result, changes to the design of the slat end seal 100 can be immediately carried out in subsequent physical creations of the slat end seal 100. This enables the components of the slat end seal 100 to be easily adjusted or scaled to fit different types of applications (e.g., for use in various wing sizes).

The layer-upon-layer process utilized in additive manufacturing can deposit one or more components of the slat end seal 100 with complex designs that might not be possible for slat end seals assembled with traditional manufacturing. In turn, the design of the slat end seal 100 can include aspects that aim to improve overall operation. For example, the design can incorporate physical elements that help redirect stresses in a desired manner that traditionally manufactured slat end seals might not be able to replicate.

Additive manufacturing also enables depositing one or more components of the slat end seal 100 in a variety of materials using a multi-material additive-manufacturing process. In such an example, the shell 102 may be made from a first material and the lattice structure 112 may be made from a second material that is different than the first material. In one particular example, the first material comprises stainless steel, titanium, nickel super-alloy, or aluminum, and the second material comprises polyether ether ketone (PEEK), polyethylene (PE), or polypropylene (PP). In another example, both the shell 102 and the lattice structure 112 are made from the same material. Other example material combinations are possible as well. Further, one or more components of the slat end seal 100 can have some layers that are created using a first type of material and other layers that are created using a second type of material. In addition, various processes are used in other examples to produce one or more components of the slat end seal 100. These processes are included in table 1.

TABLE 1

| | |
|---|---|
| DEP | Direct Energy Deposition |
| DMLS | Direct Metal Laser Sintering |
| DMP | Direct Metal Printing |
| EBAM | Electron Beam Additive Manufacturing |
| EBM | Electron Beam Leting |
| EBPD | Electron Beam Powder Bed |
| FDM | Fused Deposition Modeling |
| IPD | Indirect Power Bed |
| LCT | Laser Cladding Technology |
| LDT | Laser Deposition Technology |
| LDW | Laser Deposition Welding |
| LDWM | Laser Deposition Welding with integrated Milling |
| LENS | Laser Engineering Net Shape |
| LFMT | Laser Freeform Manufacturing Technology |
| LMD-p | Laser Metal Deposition-powder |
| LMD-w | Laser Metal Deposition-wire |
| LPB | Laser Powder Bed |
| LPD | Laser Puddle Deposition |
| LRT | Laser Repair Technology |
| PDED | Powder Directed Energy Deposition |
| SLA | Stereolithography |
| SLM | Selective Laser Melting |
| SLS | Selective Laser Sintering |
| SPD | Small Puddle Deposition |

In some example implementations, one or more components of the slat end seal 100 are generated using melt-away support materials, such as sulfone, thermoplastic, polyester, organic composite photoresist materials, and dry film resists. Particularly, during the layer-upon-layer generation process, a melt-away support material can support one or more components of the slat end seal 100 until the one or more components of the slat end seal 100 is complete and stable enough to standalone. In turn, the melt-away support material can support physical aspects of the slat end seal 100 during the layer-upon-layer generation process until the slat end seal 100 is completed. After the one or more components of the slat end seal 100 are completed, the melt-away support material can be removed to leave only the finished components remaining. For instance, a water soluble melt-away support material can rinse away from portions of slat end seal 100.

Figure 10:
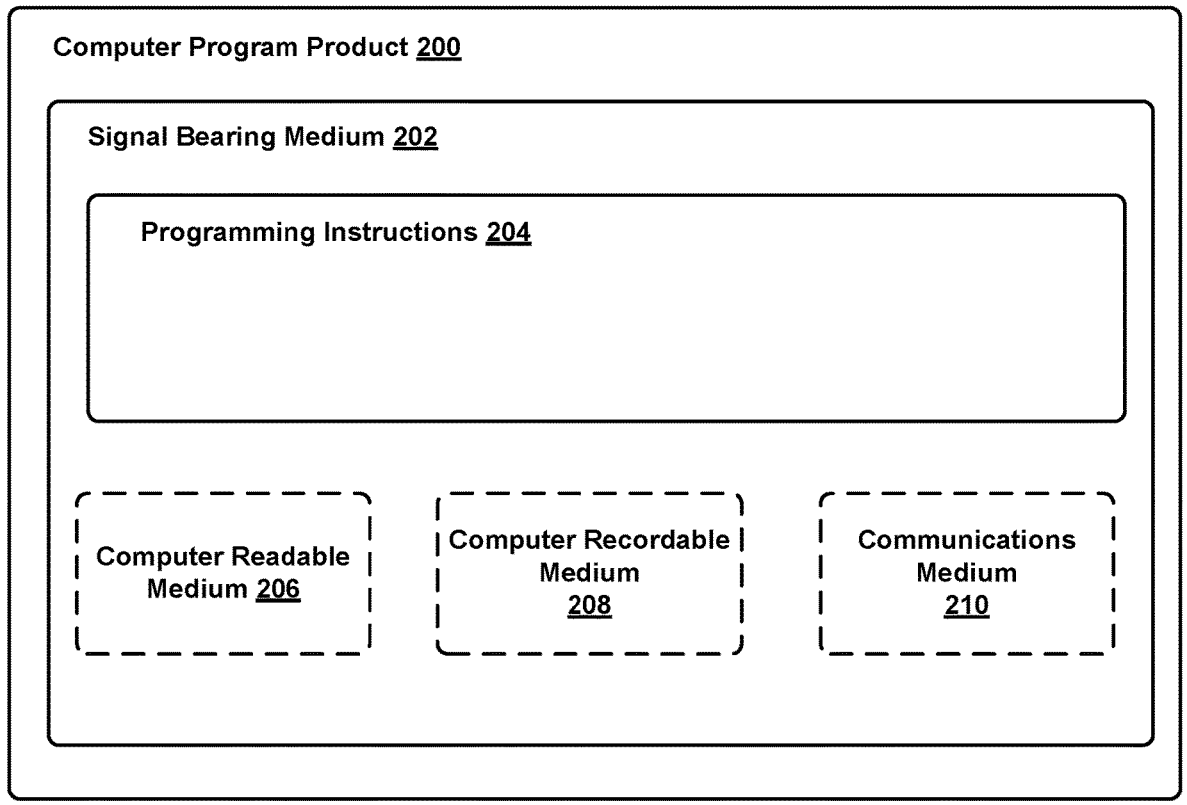
FIG. 10 is an example computer-readable medium configured according to an example implementation to cause an additive manufacturing machine to create one or more components of the slat end seal of FIGS. 1-9.

The additive-manufacturing machines and/or processes described above may be controlled by computer-readable medium. FIG. 10 depicts an example computer-readable medium configured according to an example implementation. In example implementations, the system may include one or more processors, one or more forms of memory, one or more input devices/interfaces, one or more output devices/interfaces, and machine readable instructions that, when executed by the one or more processors, cause an additive manufacturing machine to create one or more components of the slat end seal 100 of any of the examples described above with respect to FIGS. 1-9.

In one implementation, the example computer program product 200 is provided using a signal bearing medium 202. The signal bearing medium 202 may include one or more programming instructions 204 that, when executed by one or more processors may cause an additive manufacturing machine to create one or more components of the slat end seal 100 of any of the embodiment described above with respect to FIGS. 1-6. In some examples, the signal bearing medium 202 may be a computer-readable medium 206, such as, but not limited to, a hard disk drive, a Compact Disc (CD), a Digital Video Disk (DVD), a digital tape, memory, etc. In some implementations, the signal bearing medium 202 may be a computer recordable medium 208, such as, but not limited to, memory, read/write (R/W) CDs, R/W DVDs, etc. In some implementations, the signal bearing medium 202 may be a communications medium 210 (e.g., a fiber optic cable, a waveguide, a wired communications link, etc.). Thus, for example, the signal bearing medium 202 may be conveyed by a wireless form of the communications medium 210.

The one or more programming instructions 204 may be, for example, computer executable and/or logic implemented instructions. In some examples, a computing device may be configured to provide various operations, functions, or actions in response to the programming instructions 204 conveyed to the computing device by one or more of the computer-readable medium 206, the computer recordable medium 208, and/or the communications medium 210.

The computer-readable medium 206 may also be distributed among multiple data storage elements, which could be remotely located from each other. The computing device that executes some or all of the stored instructions could be an external computer, or a mobile computing platform, such as a smartphone, tablet device, personal computer, wearable device, etc. Alternatively, the computing device that executes some or all of the stored instructions could be a remotely located computer system, such as a server.

Figure 11A:
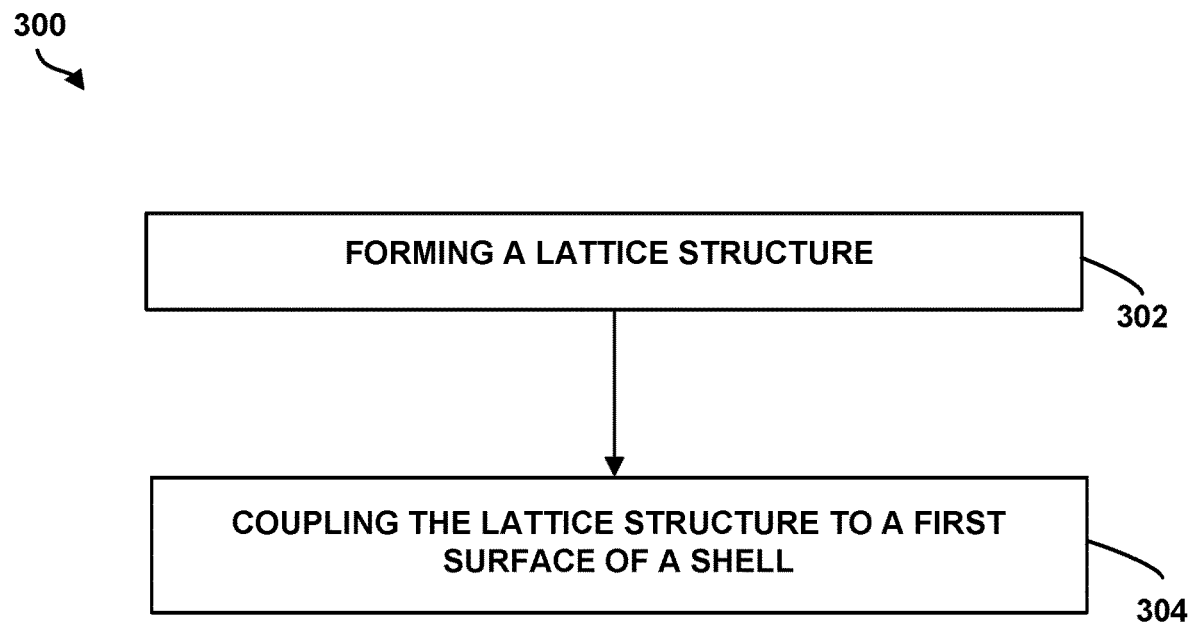
FIG. 11A is a flowchart of a method for manufacturing the slat end seal of FIGS. 1-9.

FIG. 11A is a block diagram of an example method of manufacturing a slat end seal. Method 300 shown in FIG. 11A presents an embodiment of a method that could be used to manufacture the slat end seal 100 of FIGS. 1-9, as an example. Method 300 includes one or more operations, functions, or actions as illustrated by one or more of blocks 302-304. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 300 and other processes and methods disclosed herein, the block diagram shows functionality and operation of one possible implementation of present embodiments. In this regard, the method 300 can be caused to be performed by program code, which includes one or more instructions executable by a processor or computing device for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

Initially, at block 302, the method 300 includes forming a lattice structure 112 including a plurality of supports 114 defining a plurality of interstitial voids 116 between the plurality of supports 114, wherein the lattice structure 112 includes at least one through hole 118. as discussed above, the lattice structure 112 can be formed using an additive manufacturing process performed by an additive-manufacturing machine. The additive manufacturing process enables the plurality of supports 114 to be formed. At block 304, the method 300 includes coupling the lattice structure 112 to a first surface 104 of a shell 102. The shell 102 includes a sidewall 108 extending from the first surface 104 and a plurality of through holes 110 in the first surface 104 of the shell 102. One of the plurality of through holes 110 in the first surface 104 of the shell 102 is aligned with the at least one through hole 118 of the lattice structure 112 when the lattice structure 112 is coupled to the first surface 104 of the shell 102. In one example, the lattice structure 112 is coupled to the first surface of the shell 102 by being formed integral with the shell 102 structure via an additive-manufacturing process.

Figure 11B:
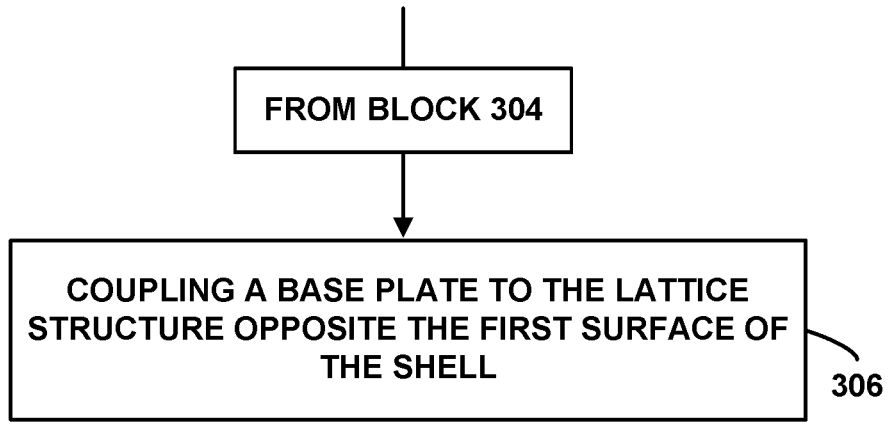
FIG. 11B is a flowchart of a method, which is a continuation of the method for manufacturing the slat end seal of FIGS. 1-9 shown in FIG. 11A.
Figure 11C:
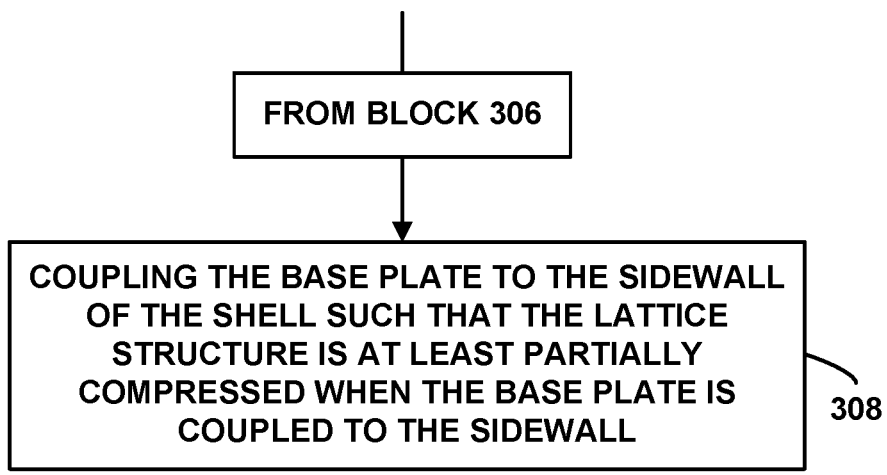
FIG. 11C is a flowchart of a method, which is a continuation of the method for manufacturing the slat end seal of FIGS. 1-9 shown in FIG. 11B.

In one example, as shown in FIG. 11B, at block 306 the method 300 further includes coupling a base plate 124 to the lattice structure 112 opposite the first surface 104 of the shell 102. In one example, the base plate 124 is coupled using an adhesive or other bonding agent. In another example, the base plate 124 is formed integrally with the shell 102 and lattice structure 112, for example via an additive-manufacturing process. In another example, as shown in FIG. 11C, at block 308 the method 300 further includes coupling the base plate 124 to the sidewall 108 of the shell 102 such that the lattice structure 112 is at least partially compressed when the base plate 124 is coupled to the sidewall 108. As discussed above, the sidewall 108 may include a first plurality of locking features 126 configured to interact with a corresponding second plurality of locking features 128 extending from the base plate 124 to thereby partially compress the lattice structure 112 when the base plate 124 is coupled to the sidewall 108. In one particular example, the first plurality of locking features 126 comprise a plurality of protrusions 130 extending from the sidewall 108 of the shell 102, and the second plurality of locking features 128 comprise a plurality of angled tabs 132 extending from the base plate 124. Other locking features are possible as well.

These example methods may be performed by an additive-manufacturing machine, such as stereolithography, multi-jet modeling, inkjet printing, selective laser sintering/melting, and fused filament fabrication, among other possibilities, as discussed above.

In the above description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts were described in conjunction with specific examples, it will be understood that these examples are not intended to be limiting.

In FIGS. 11A-11C, referred to above, the blocks may represent operations and/or portions thereof and lines connecting the various blocks do not imply any particular order or dependency of the operations or portions thereof. It will be understood that not all dependencies among the various disclosed operations are necessarily represented. FIGS. 11A-11C and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

As used herein, with respect to measurements, "about" and "substantially" each means+/−5%.

As used herein, "lattice structure" means a regularly repeating three-dimensional geometrical arrangement of a plurality of supports, where the plurality of supports intersect each other with spaces between to thereby define a plurality of interstitial voids between the plurality of supports.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may provide different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A slat end seal, comprising:
   a shell, comprising:
     a first surface,
     a second surface, opposite the first surface,
     a base plate facing the first surface,
     a sidewall, extending from the first surface to form a gap between the base plate and the sidewall, and
     a plurality of through holes in the first surface of the shell; and
   a lattice structure, coupled to the first surface of the shell and configured to compress in response to a force, applied to the second surface of the shell such that the first surface moves closer to the base plate, and the gap between the base plate and the sidewall is reduced,
   wherein the lattice structure comprises a plurality of supports, defining a plurality of interstitial voids between the plurality of supports, and wherein the lattice structure further comprises a through hole, aligned with one of the plurality of through holes in the first surface of the shell.

2. The slat end seal of claim 1, wherein:
   the through hole of the lattice structure is aligned with a first through hole of the plurality of through holes in the first surface of the shell,
   the lattice structure further comprises:
     a second through hole, aligned with a second through hole of the plurality of through holes in the first surface of the shell, and
     a third through hole, aligned with a third through hole of the plurality of through holes in the first surface of the shell, and
   the base plate comprises:
     a first through hole, aligned with the through hole of the lattice structure and with the first through hole of the plurality of through holes in the first surface of the shell,
     a second through hole, aligned with the second through hole of the lattice structure and with the second through hole of the plurality of through holes in the first surface of the shell, and
     a third through hole, aligned with the third through hole of the lattice structure and with the third through hole of the plurality of through holes in the first surface of the shell.

3. The slat end seal of claim 1, wherein the base plate is coupled to the sidewall of the shell such that the lattice structure is at least partially compressed when the base plate is coupled to the sidewall.

4. The slat end seal of claim 3, wherein:
   the sidewall comprises a first plurality of locking features,
   the base plate comprises a second plurality of locking features, and
   the first plurality of locking features is configured to interact with the second plurality of locking features, corresponding to the first plurality of locking features and extending from the base plate so that the lattice structure is partially compressed when the base plate is coupled to the sidewall.

5. The slat end seal of claim 4, wherein:
   the first plurality of locking features is a plurality of protrusions, extending from the sidewall of the shell,
   the second plurality of locking features is a plurality of angled tabs, extending from the base plate, and
   the plurality of angled tabs is configured to interact with the plurality of protrusions so that the base plate is coupled to the shell with the lattice structure at least partially compressed.

6. The slat end seal of claim 1, wherein the lattice structure comprises polyether ether ketone (PEEK), polyethylene (PE), or polypropylene (PP).

7. The slat end seal of claim 1, wherein a diameter of the plurality of supports ranges from about 1 mm to about 5 mm.

8. The slat end seal of claim 1, wherein the through hole is aligned with a first through hole of the plurality of through holes in the first surface of the shell, and the slat end seal further comprises:
   a second lattice structure, coupled to the first surface of the shell and configured to compress in response to a force, applied to the second surface of the shell, wherein the second lattice structure comprises a plurality of supports, defining a plurality of interstitial voids between the plurality of supports, and wherein the second lattice structure further comprises a second through hole, aligned with a second through hole of the plurality of through holes in the first surface of the shell; and
   a third lattice structure, coupled to the first surface of the shell and configured to compress in response to a force, applied to the second surface of the shell, wherein the third lattice structure comprises a plurality of supports, defining a plurality of interstitial voids between the plurality of supports, and wherein the third lattice structure further comprises a third through hole, aligned with a third through hole of the plurality of through holes in the first surface of the shell.

9. The slat end seal of claim 1, wherein the slat end seal is created using a multi-material additive-manufacturing process such that the shell comprises a first material and the lattice structure comprises a second material that is different than the first material.

10. The slat end seal of claim 9, wherein the first material comprises stainless steel, titanium, nickel super-alloy, or aluminum, and wherein the second material comprises polyether ether ketone (PEEK), polyethylene (PE), nylon, or polypropylene (PP).

11. A slat end seal, comprising:
    a shell, comprising:

a first surface,
a second surface, opposite the first surface, and
a sidewall, extending from the first surface, wherein the shell comprises a plurality of through holes in the first surface of the shell; and
a lattice structure, coupled to the first surface of the shell and configured to compress in response to a force, applied to the second surface of the shell,
wherein:
the lattice structure comprises a plurality of supports, defining a plurality of interstitial voids between the plurality of supports,
the lattice structure further comprises a through hole, aligned with one of the plurality of through holes in the first surface of the shell, and
a height of the lattice structure is greater than a height of the sidewall of the shell when the lattice structure is not compressed.

12. A slat end seal, comprising:
a shell, comprising:
a first surface,
a second surface, opposite the first surface, and
a sidewall, extending from the first surface, wherein the shell comprises a plurality of through holes in the first surface of the shell; and
a lattice structure, coupled to the first surface of the shell and configured to compress in response to a force, applied to the second surface of the shell,
wherein:
the lattice structure comprises a plurality of supports, defining a plurality of interstitial voids between the plurality of supports,
the lattice structure further comprises a through hole, aligned with one of the plurality of through holes in the first surface of the shell,
the through hole is aligned with a first through hole of the plurality of through holes in the first surface of the shell, and
the slat end seal further comprises:
a second lattice structure, coupled to the first surface of the shell and configured to compress in response to a force, applied to the second surface of the shell, wherein the second lattice structure comprises a plurality of supports, defining a plurality of interstitial voids between the plurality of supports, and wherein the second lattice structure further comprises a second through hole, aligned with a second through hole of the plurality of through holes in the first surface of the shell;
a third lattice structure, coupled to the first surface of the shell and configured to compress in response to a force, applied to the second surface of the shell, wherein the third lattice structure comprises a plurality of supports, defining a plurality of interstitial voids between the plurality of supports, and wherein the third lattice structure further comprises a third through hole, aligned with a third through hole of the plurality of through holes in the first surface of the shell,
a first base plate, coupled to the lattice structure opposite the first surface of the shell, wherein the first base plate comprises a first through hole, aligned with the through hole of the lattice structure and the first through hole of the plurality of through holes in the first surface of the shell;
a second base plate, coupled to the second lattice structure opposite the first surface of the shell,
wherein the second base plate comprises a second through hole, aligned with the second through hole of the second lattice structure and the second through hole of the plurality of through holes in the first surface of the shell; and
a third base plate, coupled to the third lattice structure opposite the first surface of the shell, wherein the third base plate comprises a third through hole aligned with the third through hole of the third lattice structure and the third through hole of the plurality of through holes in the first surface of the shell.

13. The slat end seal of claim 12, wherein:
the first base plate is coupled to the sidewall of the shell such that the lattice structure is at least partially compressed when the first base plate is coupled to the sidewall,
the second base plate is coupled to the sidewall of the shell such that the second lattice structure is at least partially compressed when the second base plate is coupled to the sidewall, and
the third base plate is coupled to the sidewall of the shell such that the third lattice structure is at least partially compressed when the third base plate is coupled to the sidewall.

14. The slat end seal of claim 13, wherein the sidewall comprises a first plurality of locking features, configured to interact with a second plurality of locking features, corresponding to the first plurality of locking features and extending from the first base plate, the second base plate, and the third base plate so that each of the lattice structure, the second lattice structure, and the third lattice structure is partially compressed.

15. The slat end seal of claim 14, wherein:
the first plurality of locking features is a plurality of protrusions, extending from the sidewall of the shell, and
the second plurality of locking features is a plurality of angled tabs, extending from the first base plate, the second base plate, and the third base plate.

16. A method of manufacturing a slat end seal, the method comprising a step of:
coupling a lattice structure to a shell that comprises:
a first surface,
a second surface, opposite the first surface,
a base plate, facing the first surface,
a sidewall, extending from the first surface to form a gap between the base plate and the sidewall, and
a plurality of through holes in the first surface of the shell,
wherein the step of coupling the lattice structure to the shell comprises coupling the lattice structure to the first surface of the shell such that one of the plurality of through holes in the first surface of the shell is aligned with a through hole of the lattice structure, and such that the lattice structure is configured to compress in response to a force, applied to the second surface of the shell such that the first surface moves closer to the base plate, and the gap between the base plate and the sidewall is reduced.

17. The method of claim 16, further comprising coupling the base plate to the lattice structure opposite the first surface of the shell.

18. The method of claim 17, further comprising coupling the base plate to the sidewall of the shell such that the lattice structure is at least partially compressed when the base plate is coupled to the sidewall.

19. The method of claim 16, wherein the shell further comprises a first material, and the lattice structure comprises a second material that is different than the first material of the shell.

20. The method of claim 16, wherein the lattice structure comprises polyether ether ketone (PEEK), polyethylene (PE), or polypropylene (PP).

* * * * *